United States Patent [19]
Bohlin

[11] Patent Number: 5,253,604
[45] Date of Patent: Oct. 19, 1993

[54] ELECTRO-MECHANICAL STEERING DEVICE, ESPECIALLY FOR BOATS

[75] Inventor: Stig F. Bohlin, Goteborg, Sweden

[73] Assignee: AB Volvo Penta, Goteborg, Sweden

[21] Appl. No.: 859,496

[22] PCT Filed: Dec. 13, 1990

[86] PCT No.: PCT/SE90/00831
  § 371 Date: Jul. 23, 1992
  § 102(e) Date: Jul. 23, 1992

[87] PCT Pub. No.: WO91/08947
  PCT Pub. Date: Jun. 27, 1991

[30] Foreign Application Priority Data
  Dec. 14, 1989 [SE] Sweden ............... 8904222

[51] Int. Cl.$^5$ .................................. B63H 25/20
[52] U.S. Cl. ..................... 114/144 E; 114/144 R; 74/502.4; 74/502.5
[58] Field of Search ......... 114/144 R, 144 A, 144 E; 74/480 B, 480 R, 500.5, 502.4, 503.5; 244/76 R, 197, 175, 228, 229, 232, 233; 180/79.1

[56] References Cited
U.S. PATENT DOCUMENTS

| | | | |
|---|---|---|---|
| 4,004,537 | 1/1977 | Nilsson | 114/144 R |
| 4,495,881 | 1/1985 | Teraura | 74/502.5 |
| 4,595,867 | 6/1986 | Cognevich | 114/144 E |
| 4,610,214 | 9/1986 | Kodera | 114/144 E |
| 4,872,367 | 10/1989 | Spease | 74/502.4 |
| 4,895,041 | 1/1990 | Cunningham | 74/502.6 |

FOREIGN PATENT DOCUMENTS

276463 10/1912 Fed. Rep. of Germany .
7505626 3/1977 Sweden .

*Primary Examiner*—Mark T. Le
*Assistant Examiner*—Clifford T. Bartz
*Attorney, Agent, or Firm*—Young & Thompson

[57] ABSTRACT

An electro-mechanical steering device for boats, comprising a push-pull cable (11) coupled between a steering gear (3) and a steering arm (12). The cable jacket is connected with play to the gear housing. The steering gear is coupled to a command value sender (8), the signal of which is compared in an electronics unit (10) with a signal from an actual value sensor (15) (rudder indicator) coupled to the steering arm. An electrical servo motor (14) is coupled to the steering arm and is controlled by the electronics unit in response to the difference between the command value and the actual value signals.

3 Claims, 2 Drawing Sheets

Ś,253,604

ELECTRO-MECHANICAL STEERING DEVICE, ESPECIALLY FOR BOATS

FIELD OF THE INVENTION

The present invention relates to an electro-mechanical steering device comprising a manual steering means, mechanical transmission means acting between the steering means and a steered element, said transmission means being in the form of a control cable consisting of a cable jacket and an operating cable displaceable in the jacket, an electrical servo motor coupled to the steered element, and means cooperating with the manual steering means arranged to send a steering signal to the servo motor upon actuation of the manual steering means.

BACKGROUND OF THE INVENTION

An electro-mechanical steering device, especially intended for boats, of this type is known by SE-A-392 083, for example. The steering means consists of a common steering wheel and the steered element consists of a steering arm on a steering shaft to a rudder or a steerable propeller drive unit. The mechanical transmission consists of a steering gear coupled to the steering wheel and a cable rotationally driven thereby, which is connected to a ball bearing screw, where the rotational movement is converted into a linear movement which is coupled to a servo motor. The steering wheel is joined to the steering wheel shaft via a gap connection with a pole reversing switch which, within the gap range, if the steering wheel is turned, turns the switch on or off to start or stop the servo motor.

The advantage of such an electro-mechanical system is that it is simpler and less expensive than the more widely used hydraulic servo systems. It is simple to arrange for emergency steering in event of power failure. One disadvantage of the known system described here is, however, that it lacks an electrical feedback circuit which means that it is not suitable for dual command steering, for example, i.e. with a main steering station and an extra steering station, on the flybridge, for example. There is thus no information at the extra steering station concerning the rudder setting, and this means that the steering wheel position on the flybridge will never reflect the deflection of the rudder. The slightest movement of the steering wheel from a neutral position will deflect the rudder regardless of whether or not the rudder, when it is coupled over from the main steering station to the extra steering station, already has an extreme deflection. Thus, the steering wheel at the extra steering station in practice only functions as a switch.

SUMMARY OF THE INVENTION

The purpose of the present invention is in general to provide a simple and inexpensive electro-mechanical steering device of the type described by way of introduction, which eliminates the disadvantage of the above described known steering device.

This is achieved according to the invention by virtue of the fact that the manual steering means is coupled to a command value sender, arranged to send a signal dependent on the position of the steering means relative to a predetermined position to an electronic control unit, that the steered element is coupled to an actual value sensor, disposed to send a signal, dependent on the position of the steered element relative to a predetermined position, to the control unit, which is disposed to compare said signals and send a control signal dependent on the difference to the servo motor, and that the jacket and the operating cable are so joined to the steering means and the steered element that an initial operating movement of the steering means does not cause a relative displacement between the cable and the jacket.

The invention achieves a steering device with feedback which is simple and inexpensive and can be used at multiple operating stations. If the rudder has a steering deflection and the steering wheel at the extra operating station is in a neutral position when the switch-over is made from the main operating station, the initial turning of the steering wheel at the extra operating station will not result in any additional rudder deflection as in the known system. Only when the steering wheel has been turned enough so that the command value exceeds the actual value of the rudder deflection, will there be any additional rudder deflection. The play in the mechanical transmission will result in the servo motor driving it, which results in very low manual steering forces even when steering from the main operating station.

The steering device according to the invention is particularly advantageous in combination with the mechanical transmission in the form of a steering gear and a push-pull cable connected thereto. The command value sender can consist of a rheostat mounted on the shaft of the steering gear. In certain cases, the gap which occurs to varying degrees in such a push-pull connection can be sufficient to create the above-mentioned play in the transmission. In order to ensure that there will be sufficient play under all conditions, a preferred embodiment of the steering device according to the invention has the cable jacket limitedly displaceably joined to the gear housing via an adapter sleeve, which has a portion, which is formed as an end portion of the jacket and which is fixed in the ordinary cable jacket mounting in the housing.

BRIEF DESCRIPTION OF THE DRAWINGS

The invention will be described in more detail below with reference to an example shown in the accompanying drawings, in which.

DETAILED DESCRIPTION OF THE INVENTION

Figure 1:
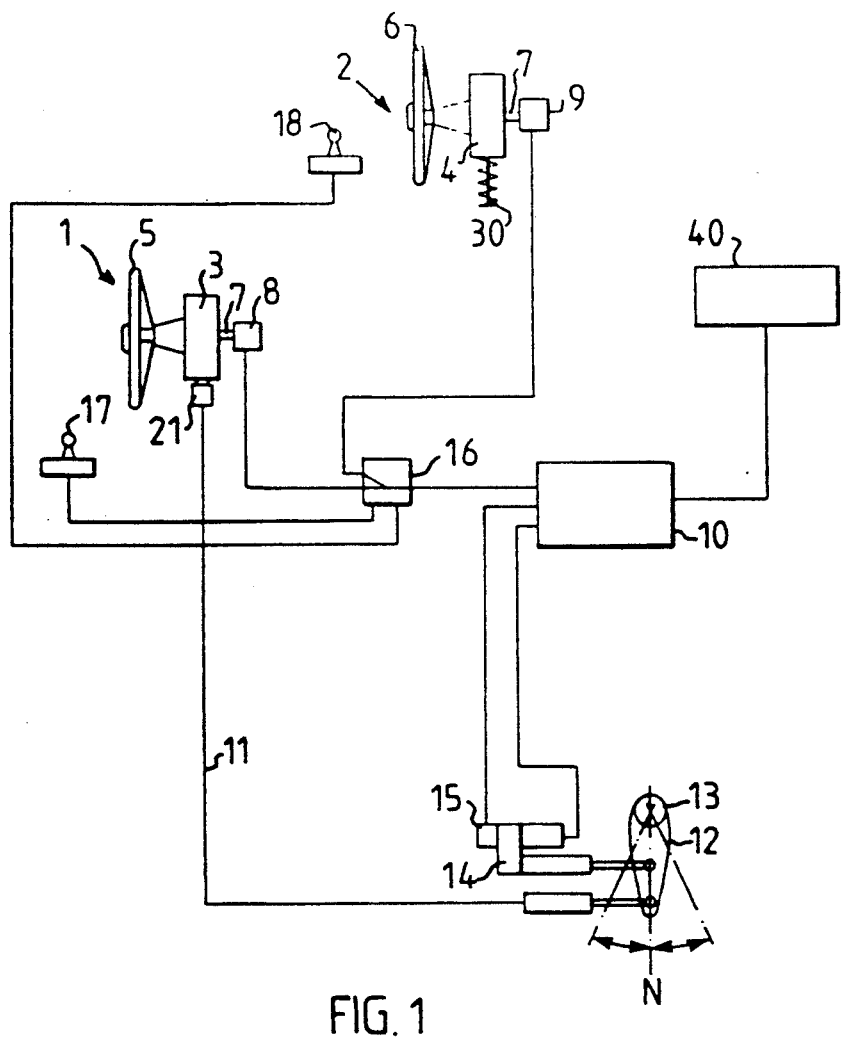
FIG. 1 is a schematic diagram of a steering device according to the invention.

In FIG. 1, the numeral 1 generally designates a main steering apparatus at a main operating station and 2 designates an extra steering apparatus on the flybridge, for example. Each of the steering apparati 1 and 2 has an individual steering gear 3 and 4 which can be of a type known per se. i.e. that marketed under the name Volvo Penta STS 330. An operating means in the form of a common steering wheel 5 and 6 is mounted on the shaft 7 for each gear as is a command value sender 8 and 9, respectively, e.g. a rheostat, which is arranged to emit a signal to an electronics unit 10, and which is dependent on the deflection of the steering wheel from a neutral position.

The gear 3 of the main steering apparatus 1 is coupled to one end of a control cable 11 of the known push-pull type, the other end of which is connected to a steering arm 12 on a turnable shaft 13, which can be a rudder shaft or a steering shaft of an outboard propeller drive unit.

An electrical servo motor 14 is also coupled to the steering arm 12. The motor 14 can be of a known brakeless type or be disengageable. An actual value sensor 15 (rudder indicator), e.g. a rheostat, is coupled to the motor 14 in such a manner that it sends a signal to the electronics unit 10 which is dependent on the angle of deflection of the steering arm 12 from a neutral position.

The steering arm 12 can be swung mechanically in the same manner as in a conventional entirely mechanical steering system via the gear 3 of the main steering apparatus 1 and the push-pull cable 11; by turning the steering wheel 5. After selection of an operating station, which is done by means of a two-way relay 16 when a button 17 or 18 is depressed at the selected operating station and current is supplied to the described components in the servo system, the turning of the steering arm 12 is effected entirely by the servo motor 14.

Figure 2:
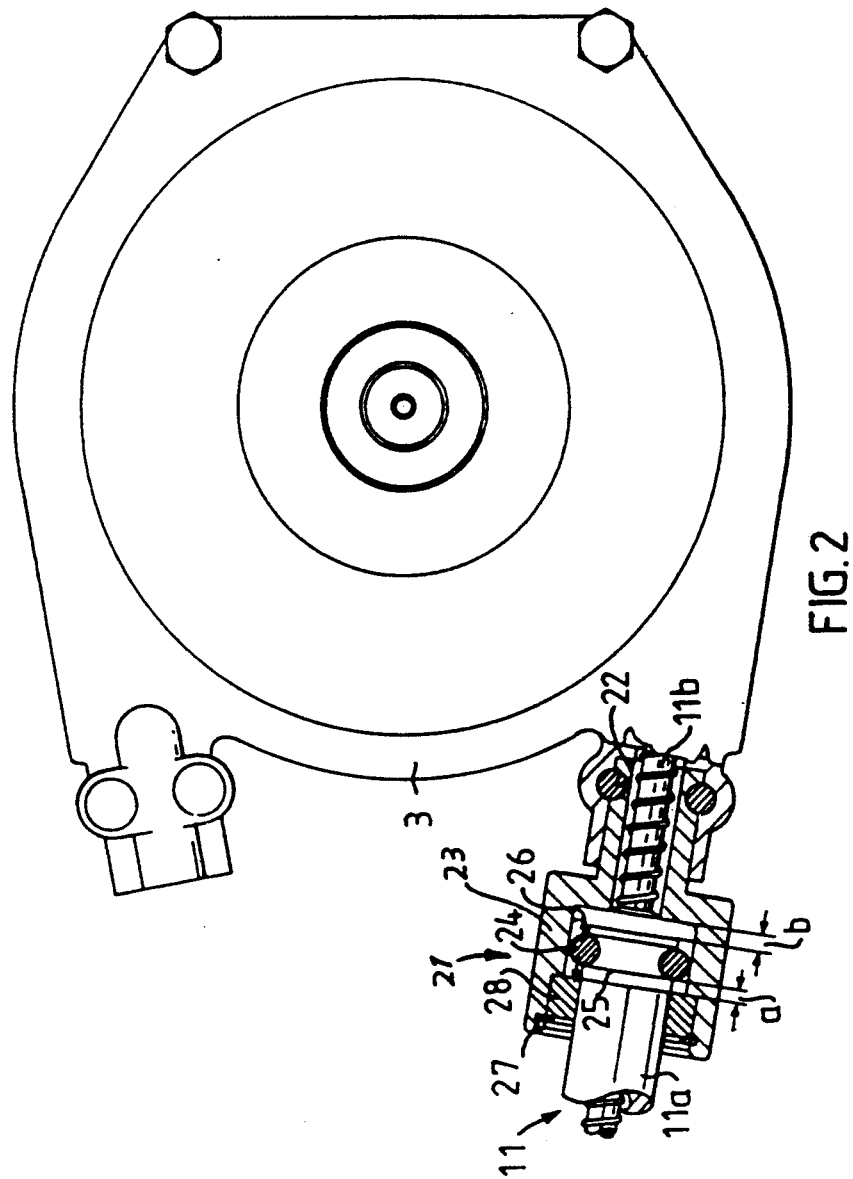
FIG. 2 is an end view of a steering gear housing with cable connection.

In order to reduce the resistance to turning of the steering wheel as much as possible when deflecting the rudder, the servo motor 14 and not the steering gear 13 must overcome the mechanical resistance in the control cable 11, i.e. the friction between its jacket 11a and the operating cable 11b. According to the invention, the jacket 11a is joined to the steering gear 3 housing by means of an adapter sleeve 21 which has an end portion with the same diameter as the end portion of the jacket 11a and is made with a groove 22 for engagement with the ordinary mounting clamp for the jacket in the gear housing. The sleeve 21 has a broadened portion 23, which receives the end portion of the jacket. A circular helical spring 24 is laid into a groove 25 in the jacket and guides it radially in a cylindrical cavity in the sleeve portion 23. A stop ring 28 fixed by a lock ring 27 limits the length of the cavity 26 in such a manner that the jacket 11a is displaceable a total distance a+b, as shown in FIG. 2.

The embodiment described permits the jacket 11a and the operating cable 11b to be displaced as a unit upon initial turning on the steering wheel 5. The command value sender 8 sends a signal dependent on the turning of the steering wheel to the electronics unit 10, which compares this signal with the actual value signal from the sensor 15 and controls the servo motor 14 to turn the steering arm 12 until the difference is zero.

In the embodiment shown in FIG. 1, there is no mechanical connection in the form of a push-pull cable at the extra steering apparatus 2. The steering gear 4 is biased by springs 30 to a neutral position to provide a certain amount of steering feel. If so desired, the steering gear 4 can be coupled mechanically to the steering arm 12 with the aid of a push-pull cable 11.

The steering device described here can be combined with advantage with a compass and an electronics unit 40, as indicated in FIG. 1, thus forming a complete auto-pilot system, which does not need to be supplemented with additional servo motors and associated control electronic equipment.

I claim:

1. In an electro-mechanical steering device, comprising a manual steering means, mechanical transmission means acting between the steering means and steered element, said transmission means being in the form of a control cable consisting of a cable jacket and an operating cable displaceable in the jacket, an electrical servo motor coupled to the steered element, and means cooperating with the manual steering means arranged to send a steering signal to the servo motor upon actuation of the manual steering means, the improvement wherein the manual steering means (5) is coupled to a command value sender (8), arranged to send a signal dependent on the position of the steering means relative to a predetermined position to an electronic control unit (10), the steered element (12) is coupled to an actual value sensor (15), disposed to send a signal, dependent on the position of the steered element relative to a predetermined position, to the control unit, said control unit being disposed to compare said signals and send a control signal dependent on the difference to the servo motor (14), and the jacket and the operating cable are so joined to the steering means and the steered element that an initial operating movement of the steering means does not cause a relative displacement between the cable and the jacket.

2. Steering devices according to claim 1, wherein the steering means is a steering wheel (5) coupled to a steering gear and the steered element is a steering arm (12) of a rudder or a propeller drive unit, and said jacket (11a) of the control cable is fixed in a gear housing (3) in which the steering wheel shaft (7) is rotatably journalled, in such a manner that the jacket is limitedly displaceable in its longitudinal direction relative to the gear housing.

3. Steering device according to claim 2, wherein the cable jacket (11a) is joined to the gear housing (3) via an adapter sleeve (21), which has a portion formed as an end portion of the jacket, extending into and being fixed in a mounting in the housing designed for an end of the jacket, and an end of the jacket is limitedly displaceably received in the adapter sleeve.

* * * * *